US010335871B2

United States Patent
Harpaz et al.

(10) Patent No.: US 10,335,871 B2
(45) Date of Patent: Jul. 2, 2019

(54) REPLACEABLE FACE-MILLING HEAD WITH INTEGRALLY FORMED THREADED SHANK-CONNECTOR

(71) Applicant: Iscar, Ltd., Tefen (IL)

(72) Inventors: Jacob Harpaz, Kfar Vradim (IL); Eliyahu Budda, Neve Ziv (IL); Ely Erlich, Karmiel (IL)

(73) Assignee: Iscar, Ltd., Tefen (IL)

( * ) Notice: Subject to any disclaimer, the term of this patent is extended or adjusted under 35 U.S.C. 154(b) by 357 days.

(21) Appl. No.: 15/096,806

(22) Filed: Apr. 12, 2016

(65) Prior Publication Data
US 2017/0291230 A1 Oct. 12, 2017

(51) Int. Cl.
*B23C 5/10* (2006.01)
*B23B 31/11* (2006.01)
*B23B 5/22* (2006.01)
*B23C 5/28* (2006.01)

(52) U.S. Cl.
CPC ................. *B23C 5/10* (2013.01); *B23C 5/28* (2013.01); *B23B 31/11* (2013.01); *B23B 31/1115* (2013.01); *B23C 2210/02* (2013.01); *B23C 2210/03* (2013.01); *B23C 2210/0457* (2013.01); *B23C 2210/54* (2013.01); *B23C 2250/12* (2013.01)

(58) Field of Classification Search
CPC ... B23C 2210/02; B23C 2250/12; B23C 5/28; B23C 5/10; B23C 2210/0457; B23C 2210/03; B23C 2210/54; B23B 31/1107; B23B 31/1115; B23B 31/1122; B23B 2251/14; B23B 31/11
See application file for complete search history.

(56) References Cited

U.S. PATENT DOCUMENTS

| | | | | |
|---|---|---|---|---|
| 756,339 A * | 4/1904 | Down | ........................... | 175/394 |
| 4,438,953 A * | 3/1984 | Timme, Jr. | ............ | E21B 17/042 |
| | | | | 285/333 |
| 5,094,573 A * | 3/1992 | Hougen | ............... | B23B 51/0406 |
| | | | | 407/53 |
| 5,598,751 A * | 2/1997 | Ochayon | ................... | B22F 5/06 |
| | | | | 408/226 |
| 5,971,670 A * | 10/1999 | Pantzar | ............... | B23B 31/1107 |
| | | | | 407/119 |
| 6,485,220 B2 | 11/2002 | Hecht | | |
| 7,341,409 B2 * | 3/2008 | Jonsson | ................... | B23B 31/11 |
| | | | | 407/30 |

(Continued)

OTHER PUBLICATIONS

Mitsubishi-Hitachi Tool Engineering EHX catalog (Year: 2019).*

(Continued)

*Primary Examiner* — Sara Addisu
(74) *Attorney, Agent, or Firm* — Womble Bond Dickinson (US) LLP (57) ABSTRACT

A replaceable face-milling head configured for rotating about a central rotation axis $A_R$. The head includes a cutting portion and an integrally formed threaded shank-connector portion, the latter of which being configured for connecting to a shank. A length-diameter ratio LDR, defined as a cutting portion length $L_C$ divided by a cutting portion diameter $D_E$, fulfills the condition: LDR≤1.00.

23 Claims, 3 Drawing Sheets

(56) References Cited

U.S. PATENT DOCUMENTS

| | | | |
|---|---|---|---|
| 7,374,376 B2 | 5/2008 | Jonsson et al. | |
| 7,407,351 B2* | 8/2008 | Pantzar | B23C 5/10 279/8 |
| 8,226,333 B2 | 7/2012 | Kakai et al. | |
| 8,931,983 B2 | 1/2015 | Sharivker et al. | |
| 8,939,685 B2* | 1/2015 | Cigni | B23C 5/10 407/11 |
| 9,827,620 B2* | 11/2017 | Abe | B23B 31/1122 |
| 9,868,162 B2* | 1/2018 | Maeda | B23C 5/10 |
| 9,889,509 B2* | 2/2018 | Sharivker | B23C 5/10 |
| 2001/0041089 A1* | 11/2001 | Hecht | B23B 31/11 403/343 |
| 2002/0006315 A1* | 1/2002 | Harpaz | B23B 31/11 407/30 |
| 2006/0072977 A1* | 4/2006 | Jonsson | B23B 31/1107 408/233 |
| 2006/0073744 A1* | 4/2006 | Jonsson | B23B 31/11 439/884 |
| 2007/0248421 A1* | 10/2007 | Kakai | B23B 31/1107 407/34 |
| 2008/0304923 A1* | 12/2008 | Lehto | B23B 31/005 407/100 |
| 2009/0060663 A1* | 3/2009 | Rouge | B23C 5/10 407/44 |
| 2012/0009027 A1* | 1/2012 | Sharivker | B23B 31/11 407/42 |
| 2013/0272806 A1* | 10/2013 | Guay | B23C 5/10 407/11 |
| 2014/0056658 A1* | 2/2014 | Maeda | B23C 5/109 407/40 |
| 2014/0255113 A1 | 9/2014 | Davis et al. | |
| 2014/0356081 A1* | 12/2014 | Davis | B23C 5/10 407/11 |
| 2015/0016905 A1* | 1/2015 | Haimer | B23B 31/1115 408/57 |
| 2015/0063928 A1* | 3/2015 | Maeda | B23C 5/10 407/42 |
| 2015/0202690 A1* | 7/2015 | Haimer | B23B 31/1115 279/99 |
| 2015/0224586 A1* | 8/2015 | Fang | B23C 5/06 407/66 |
| 2015/0258616 A1* | 9/2015 | Stanbach | B23C 5/10 407/54 |
| 2015/0314379 A1* | 11/2015 | Sharivker | B23C 5/10 407/34 |
| 2016/0082526 A1* | 3/2016 | Swift | B23C 5/28 407/11 |
| 2016/0228955 A1 | 8/2016 | Leirer et al. | |
| 2017/0266738 A1* | 9/2017 | Guy | B23C 5/10 |

OTHER PUBLICATIONS

International Search Report dated Jul. 25, 2017, issued in PCT counterpart application (No. PCT/IL2017/050379).

Written Opinion dated Jul. 25, 2017, issued in PCT counterpart application (No. PCT/IL2017/050379).

Online Catalog—Cutting Tools from Sandvik Coromant, Rotating Tools—Milling, pp. D211-D224, Sandvik 2012, retrieved Apr. 8, 2016 at http://sandvik.coromant.com/sitecollectiondocuments/downloads/global/catalogues/en-gb/rotating/rot_d.pdf.

\* cited by examiner

REPLACEABLE FACE-MILLING HEAD WITH INTEGRALLY FORMED THREADED SHANK-CONNECTOR

FIELD OF THE INVENTION

The subject matter of the present application relates to replaceable milling heads, and more particularly replaceable milling heads configured with at least one axial cutting edge for facing operations. Such replaceable milling heads are also called "face-milling heads", or for succinctness "milling heads" or "heads" hereinafter, all of which, in this application, are meant to specifically refer to milling heads configured with at least one such axial cutting edge. Such "axial cutting edge(s)", are also called "primary cutting edge(s) at the head front face" below.

BACKGROUND OF THE INVENTION

End mills differ from drills in that they can also machine in a non-axial direction, and generally most if not all of their machining is in a non-axial direction.

Generally speaking, end mills can be theoretically divided into the following categories: insert-mills, solid end mills and replaceable milling heads.

Insert-mills are milling tools which comprise tool holders with pockets and replaceable inserts, typically indexable, configured to be mounted in the pockets. An advantage of insert-mills is that the replaceable inserts, which are made of comparatively expensive, harder, material constitutes a relatively small portion of the milling tool. The tool holders comprise a shank which is held securely by a collet or chuck during milling.

Unlike insert-mills which only require replacement of small inserts, solid end mills comprise integrally formed teeth and the entire solid end mill is replaced after it is worn. Solid end mills also comprise an integrally formed shank which is held securely by a collet or chuck during milling. Accordingly solid end mills utilize far more comparatively expensive material than insert-mills. Despite the comparatively higher cost, at least one advantage of solid end mills over insert-mills is that the solid end mill's single integrally formed body can be manufactured comparatively smaller allowing milling in relatively smaller locations.

Replaceable milling heads are similar to solid end mills in that they have integrally formed teeth. However they differ in that they have a shank-connector portion configured for attachment and removal from a shank. While solid end mills with their integrally formed shanks can, for example, be advantageous in terms of strength, vibration and simplified manufacture, a replaceable milling head's shank, which is held by a collet or chuck during milling, need not be replaced after the head is worn. Further, even though replaceable milling heads use more expensive material than insert mills they use less than solid end mills.

The subject matter of the present application is directed only to the latter category, namely replaceable milling heads.

More specifically, the present application is directed to heads configured for facing operations (i.e. configured with at least one axial cutting edge for a face milling operation, i.e. an operation carried out at the face of the head but in a non-axial direction). Preferred embodiments are directed also to heads configured only for facing operations, i.e. without using any radial cutting edges along the periphery of a cutting portion. Most preferred embodiments are directed specifically to heads having fast-feed tooth configurations, i.e. for machining only with axial cutting edges (stated differently, configured not to use even corner cutting edges, which are located between radial and axial cutting edges).

SUMMARY OF THE INVENTION

According to a first aspect of the subject matter of the present application there is provided a replaceable face-milling head comprising at least one primary cutting edge at a head front face and characterized in that a length-diameter ratio LDR defined as the cutting portion length $L_C$ divided by the cutting portion diameter $D_E$ fulfills the condition: $LDR \leq 1.00$.

For the purposes of the specification and claims, unless stated to the contrary, each value given is meant to have a tolerance of ±0.01. For example, a condition stating: $LDR=1.00$, could alternatively be written as $LDR=1.00\pm0.01$.

While a length-diameter ratio LDR of less than or equal to 1.00 is advantageous over known designs, due to reduced material needed, a specific ratio of $LDR=1.00$ has a special benefit, in that it is still sufficiently long for non-fast feed tooth geometries, particularly those configured for finish or corner machining operations which only incur relatively small machining forces and correspondingly low heat transfer to a shank-connector portion thereof.

Additionally, preferably for heads where the axial cutting edges thereof are configured to carry out the majority of the milling, or most preferably the entirety of the milling operation (as is the case with fast-feed tooth configuration), it has been found that even ratios of LDR even less than 1.00 are feasible and even beneficial.

Regarding heat transfer, heads are typically utilized so that cheaper, typically less heat resistant material, can be used for the accompanying shank (e.g. steel rather than cemented carbide). A disadvantage in producing relatively short replaceable milling heads is that with decreasing length of the head an increased amount of heat is transferred from a workpiece to the head, e.g. via contact with the chips machined therefrom, which in turn can excessively heat the connection area of a shank-connector of the head and the shank secured to the head via the shank-connector. Overheating can impede or sometimes prevent removal of a head from a shank, which can thereby nullify the main benefit of using a replaceable head. Yet another disadvantage is the inability to provide a short milling head with a design incorporating a "sweet spot" (i.e. stable milling speed) which can further reduce vibration.

Without being bound to theory, excessive heating has not been found to occur with face-milling heads due to their main area of contact with the workpiece being at a front face of the head and not along the periphery thereof, thereby distancing the heat from a shank holding the head and allowing even comparatively shorter heads than previously known to the applicant.

Further, it is believed that a reduced length-diameter ratio LDR provides further stability which also compensates, e.g., for the lack of a sweet spot.

Such head design could perhaps be considered a new hybrid end mill between known milling heads and insert-mills, since the amount of expensive material used for the head (typically, although not limited to, cemented carbide) is less than previously known and therefore approaches closer to the amount used for inserts of insert-mills.

According to a second aspect of the subject matter of the present application there is provided a replaceable face-milling head configured for rotating about a central rotation axis $A_R$ defining opposite axially forward and rearward directions $D_F$, $D_R$ and opposite rotational preceding and succeeding directions $D_P$, $D_S$, the preceding direction $D_P$ being the cutting direction, the face-milling head comprising: a head rear face, a head front face and a head peripheral surface extending from the head rear face to the head front face; a shank-connector portion formed with external threading and extending forward from the head rear face; a cutting portion integrally formed with the shank-connector portion and extending forward from the shank-connector portion to the head front face; a cutting portion length $L_C$ measurable parallel to the central rotation axis $A_R$; and a perpendicular plane $P_P$ adjacent the head front face and extending perpendicular to the central rotation axis $A_R$, the cutting portion comprising: a plurality of integrally formed teeth, each of the teeth comprising a primary cutting edge at the head front face; a plurality of flutes alternating with the plurality of teeth; and a cutting portion diameter $D_E$; characterized in that a length-diameter ratio LDR defined as the cutting portion length $L_C$ divided by the cutting portion diameter $D_E$ fulfills the condition: $0.3 \leq LDR \leq 1.00$.

According to a third aspect of the subject matter of the present application there is provided a replaceable face-milling head characterized in that a length-diameter ratio LDR defined as a cutting portion length $L_C$ divided by a cutting portion diameter $D_E$ fulfills the condition: $LDR \leq 1.00$ and teeth of the face-milling head are configured with a fast-feed geometry.

A so-called "fast-feed geometry" is a specific facing geometry configured to machine comparatively small chips compensated with a comparatively high feed rate to increase the relatively small amount of material removed by the comparatively smaller chips. Such design can be particularly beneficial for high-removal rates (i.e. roughing operations). Even though roughing operations generate more heat transfer than finish operations, it has so far been found that the fast-feed geometry and/or location sufficiently prevent overheating of the connection area of a shank-connector and a connected shank. Additional features described below, such as, e.g., a coolant hole also benefit this purpose.

More precisely, each tooth having a fast-feed geometry can be defined as comprising: a relief edge extending along a head peripheral surface; a convexly curved outer corner connected to the relief edge and comprising a radial extremity point of a cutting portion; said primary cutting edge connected to, and extending in a forward-inward direction from, the outer corner; a convexly curved inner corner connected to the primary cutting edge; and a ramping cutting edge connected to, and extending in a rearward-inward direction from, the inner corner.

According to a fourth aspect of the subject matter of the present application there is provided a replaceable face-milling head characterized in that a length-diameter ratio LDR defined as a cutting portion length $L_C$ divided by a cutting portion diameter $D_E$ fulfills either the condition: $LDR=0.50\pm0.05$ (or more preferably $LDR=0.50\pm0.01$) or $LDR=1\pm0.01$. Special advantages of these precise length-diameter ratio values are described below.

According to a fifth aspect of the subject matter of the present application there is provided a replaceable face-milling head comprising at least one primary cutting edge at a head front face, an integrally formed cutting portion and threaded shank portion, characterized in that the head is devoid of a fastening construction and a length-diameter ratio LDR defined as the cutting portion length $L_C$ divided by the cutting portion diameter $D_E$ fulfills the condition: $LDR \leq 1.00$.

According to a sixth aspect of the subject matter of the present application there is provided a face-milling assembly comprising a face-milling head according to any of the previous aspects and a shank; the shank comprising: a shank rear face; a shank front face; and a shank peripheral surface extending from the shank rear face to the shank front face; the shank front face being formed with an opening configured to receive a shank-connector portion of the head.

It will be understood that the above-said is a summary, and that any of the aspects above may further comprise any of the features described hereinbelow. Specifically, the following features, either alone or in combination, may be applicable to any of the above aspects:

A. A head can comprise a head rear face, a head front face and a head peripheral surface extending from the head rear face to the head front face.

B. A head can comprise a cutting portion and a shank-connector portion. The cutting portion can extend forward from a shank-connector portion. The cutting portion can be integrally formed with the shank-connector portion. The entire head can be integrally formed, or stated differently can have unitary one-piece construction. This is preferred for stability during machining. For example the entire head can be produced as a single pressed and sintered body. Such body may be pressed to a desired finalized or essentially finalized shape, i.e. including teeth and flutes, or alternatively, e.g., may have the flutes and teeth ground in a subsequent manufacturing process.

C. A cutting portion and a shank-connector portion can meet at an intersection. A cutting portion can comprise a rearwardly facing cutting portion annular surface surrounding the shank-connector. The intersection can be located at an axial location along the central rotation axis where the shank-connector portion and the rearwardly facing cutting portion annular surface are located.

D. A cutting portion can comprise a plurality of integrally formed teeth and a plurality of flutes alternating with the plurality of teeth.

E. A cutting portion can comprise a cutting portion diameter $D_E$. More precisely, the cutting portion diameter $D_E$ can be defined as a largest diameter of the cutting portion. The cutting portion diameter $D_E$ can be located at or directly adjacent to a head front face.

F. A shank-connector portion can extend forward from a head rear face.

G. A shank-connector diameter $D_{SC}$ can be smaller than a cutting portion diameter $D_E$. Preferably the shank-connector diameter $D_{SC}$ can be smaller than a smallest outer diameter $D_M$ of the cutting portion. Preferably a diameter ratio DDR defined as the shank-connector diameter $D_{SC}$ divided by the cutting portion diameter $D_E$ fulfills the condition: $0.6 \leq DDR \leq 0.8$.

H. A shank-connector length $L_S$ can be measureable from a head rear face to the cutting portion.

I. A shank-cutting portion length ratio SCR is defined as the cutting portion length $L_C$ divided by a shank-connector length $L_S$ and can fulfill the condition: $0.3 \leq SCR \leq 1.5$.

J. A shank-connector portion can preferably be formed with external threading. Preferably, the outermost point of each thread can lie along an imaginary cylinder. Preferably, the innermost point of each thread can lie along an imaginary cylinder.

K. The shank-connector portion can comprise a frustoconical section located between the external threading and the cutting portion. Preferably the frustoconical section can have an axial length constituting less than a third, and more preferably less than a quarter, of a shank-connector length $L_S$.

L. A head's total length $L_T$ is defined from a head rear face to a head front face.

M. A cutting portion length $L_C$ can be measurable parallel to a central rotation axis $A_R$. More precisely, the cutting portion length $L_C$ is defined as extending from an intersection of a shank-connector portion and a cutting portion to a head front face.

N. A perpendicular plane $P_P$ can be located adjacent a head front face and can extend perpendicular to a central rotation axis $A_R$.

O. A length-diameter ratio LDR is defined as a cutting portion length $L_C$ divided by the cutting portion diameter $D_E$. The length-diameter ratio LDR is less than or equal to 1.00 (LDR≤1.00). The length-diameter ratio LDR can preferably fulfill the condition: 0.3≤LDR≤1.00. It will be understood that, generally speaking, a smaller ratio is preferred over a larger ratio (i.e. values closer to 0.3 are generally preferred). However there are a number of considerations described herein to be taken account for preferential ratios.

P. It is more structurally secure to produce axial edges with a length-diameter ratio LDR≥0.3 or preferably greater than or equal to 0.4 (LDR≥0.40), even though additional expensive material is utilized with a larger ratio. A special ratio, allowing simplification of manufacture across different diameter sizes, while utilizing only a small amount of extra material, is LDR=0.50±0.05. More preferably, LDR=0.5±0.01.

Q. While a length-diameter ratio LDR of less than or equal to 1.00 is advantageous over known designs, with an increasingly smaller ratio, e.g. LDR≤0.90 the advantage is more significant due to increased stability and less material. Nonetheless, even though as the ratio decreases below LDR=1.00 comparatively less expensive material is required, a special ratio of LDR=1.00 is still believed beneficial.

R. It will be understood that a fastening construction is normally used to secure a milling head to a shank. For example, a milling head can be configured with a fastening construction formed at the cutting portion along the head peripheral surface thereof. A typical construction along the head peripheral surface can be two flat recesses on opposing sides of the head peripheral surface configured to engage a spanner. In such case, a preferred ratio is 0.50≤LDR≤1.00, preferably 0.6≤LDR≤0.90, with values tending to the middle of these ratios being most preferred. Nonetheless, an alternative option would be the use of a special key configured be placed on or around the milling head to rotate it securely into a mounted position on the shank, and in such case the head can be devoid of a fastening construction. Such keys are less typical since they are typically specially produced for each tooth-flute configuration. Nonetheless, it is conceivable that a milling head according to the subject matter of the present invention can be devoid of any fastening construction and in such case the length-diameter ratio LDR could use a particularly small amount of material, for example LDR≤1.00, preferably 0.3≤LDR≤0.7.

S. The center of gravity of the head can be located in the cutting portion. Such configuration may require increasing the LDR to a value higher than the minimum value required for tooth strength and heat transfer considerations but may be beneficial in cases where the cutting portion is ground in a standard manner as opposed to, for example, injection molded or held in an atypical manner during grinding. Stated differently, the cutting portion can be sized such that the weight thereof is greater than the weight of the shank-connector portion.

T. Each tooth of a plurality of teeth can, in a view along the central rotation axis towards the front face, can have a majority thereof extending inward of a smallest outer diameter of the cutting portion.

U. Each tooth of a plurality of teeth can be positioned front-of-center. Such geometry can have an advantageous chip ejection effect thereby reducing heat transfer to the cutting portion. This can be particularly advantageous in combination with a central coolant hole due to reduced production steps required.

V. A head can comprise a coolant arrangement. Preferably, a coolant hole can open out at the center of a front face. In addition to the standard coolant effect, such position for face milling can have an advantageous chip ejection effect (in which case even air, rather than fluid, could also be utilized) thereby reducing heat transfer to the cutting portion. This can be particularly advantageous in combination with teeth positioned front of center teeth due to reduced production steps required. Most preferably the coolant hole can extend coaxially with a central rotation axis $A_R$.

W. Each tooth of a plurality of teeth can comprise: a relief edge extending along a head peripheral surface; a convexly curved outer corner connected to the relief edge and comprising a radial extremity point of a cutting portion; a primary cutting edge connected to, and extending in a forward-inward direction from, the outer corner; a convexly curved inner corner connected to the primary cutting edge; and a ramping cutting edge connected to, and extending in a rearward-inward direction from, the inner corner. Such tooth geometry can be advantageous in allowing machining at high feed rate while having relatively small heat transfer to the shank-connector.

X. In a rearward view along a central rotation axis $A_R$, each tooth of a plurality of teeth of the cutting portion can be convexly curved, at least from an inner corner to an outer corner. Preferably, an entirety of each tooth can be convexly curved. In the example described below the entirety of each tooth is convexly curved in such view, however it is noted that the radius of curvature close to the center of the front face is very large such that the curvature is not easily visible without magnification.

Y. A primary cutting edge can be straight or, preferably, convexly curved with a cutting edge radius. The cutting edge radius can be greater than the outer corner radius. The cutting edge radius can preferably be at least eight times greater that the outer corner radius.

Z. An outer corner of each tooth can have an outer corner radius. The outer corner radius can preferably be smaller than or equal to 2 mm.

AA. An inner corner of each tooth can have an inner corner radius.

BB. A relief edge of each tooth can preferably extend in a rearward-inward direction from the outer corner. Such geometry can be beneficial particularly for roughing operations.

CC. A first connection point can be defined where the primary cutting edge and the inner corner connect; a second connection point can be defined where the primary cutting edge and the outer corner connect; and an imaginary straight line is defined between the first and second connection points and together with the perpendicular plane can subtend a cutting angle α fulfilling the condition: $10°≤α≤25°$. Cutting angles α approaching the middle of this range (i.e. 17.5°) are more preferred, since this value or values close thereto allow removal of relatively large chips/material, when compared to smaller angles, even though this can result in an increased heat transfer to the cutting portion.

DD. A lead-in-angle θ subtended by a perpendicular plane $P_P$ and a ramping cutting edge can fulfill the condition: $10°≤θ≤30°$. Lead-in-angle values in this range and those particularly approaching of 20° are most preferred, for allowing rapid ramp down, even though this is typically a very small part of the overall machining process.

EE. A plurality of teeth can preferably comprise 5 to 7 teeth. A most preferred number of teeth being exactly 6 teeth. Such relatively high number of teeth also assists in reducing heat transfer to the machining head.

FF. A plurality of teeth can each extend helically from the head front face to along the head peripheral surface.

GG. A face-milling assembly can comprise a shank and a milling head.

HH. A shank can comprise a shank rear face; a shank front face; and a shank peripheral surface extending from the shank rear face to the shank front face.

II. A shank front face can be formed with an opening configured to receive the shank-connector portion. The opening can be formed with an internal threading. The shank front face can comprise a forwardly facing shank annular surface JJ. A shank can have a shank length $L_{SH}$ at least three times greater than a total length $L_T$ of the milling head.

KK. A shank can be configured to be more heat resistant than steel. For example the shank can be coated with a heat-resistant coating. The shank can be made of cemented carbide or another material having a heat resistance greater than steel.

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Figure 1:
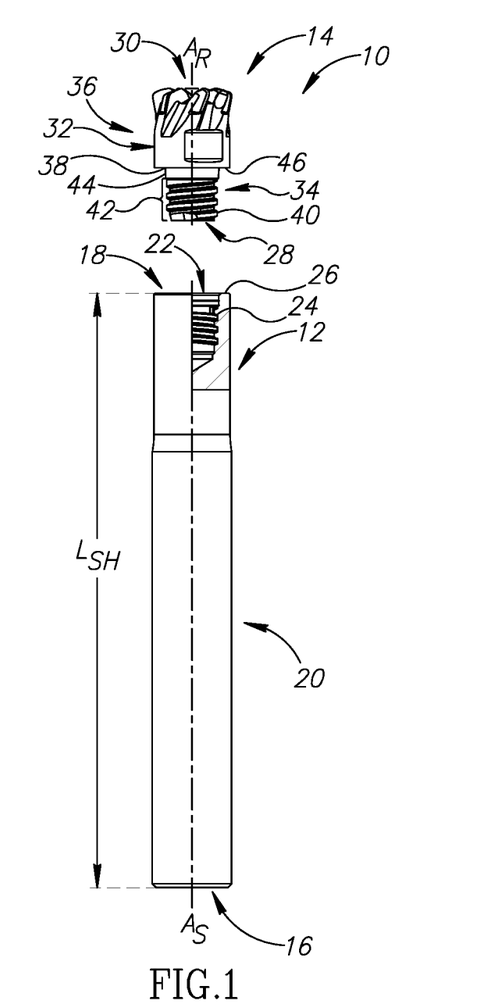
FIG. 1 is an exploded side view of a milling head and shank according to the subject matter of the present application.

Referring to FIG. 1, typical features of a face-milling assembly 10 will first be described. The face-milling assembly 10 comprises a shank 12 and a head 14.

The shank 12 comprises a shank rear face 16, a shank front face 18 and a shank peripheral surface 20.

The shank front face 18 can be formed with an opening 22. The opening 22 can be centrally located. The opening 22 can be formed with an internal threading 24.

The shank front face 18 can further comprise a forwardly facing shank annular surface 26. The shank annular surface 26 can surround the opening 22.

The shank can have shank axis $A_S$, along which a shank length $L_{SH}$ can be measured. The shank length $L_{SH}$ can be configured with a standard length for being held by a collet (not shown).

The head 14 can comprise a head rear face 28, a head front face 30 and a head peripheral surface 32 extending from the head rear face 28 to the head front face 30.

The head 14 further comprises a shank-connector portion 34 and a cutting portion 36.

The shank-connector portion 34 can extend from the rear face 28 to an intersection 38 of the shank-connector portion 34 and cutting portion 36.

The shank-connector portion 34 can be formed with external threading 40. More precisely the shank-connector portion 34 can comprise a lower connector section 42 and an upper connector section 44. The upper connector section 44 can connect the lower connector section 42 and the cutting portion 36. The external threading 40 can be formed on the lower connector section 42. The upper connector section 44 can preferably be frustoconical.

The cutting portion 36 can comprise a cutting portion annular surface 46 surrounding the shank-connector 34.

The head 14 can be secured to the shank 12 via the internal and external threading 24, 40, typically with the shank annular surface 26 abutting the cutting portion annular surface 46.

Figure 2:
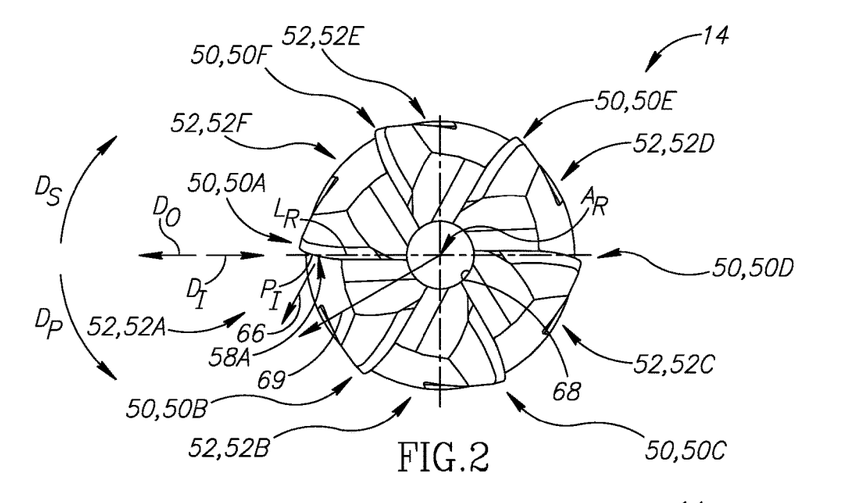
FIG. 2 is a front end view of a milling head in FIG. 1.
Figure 3:
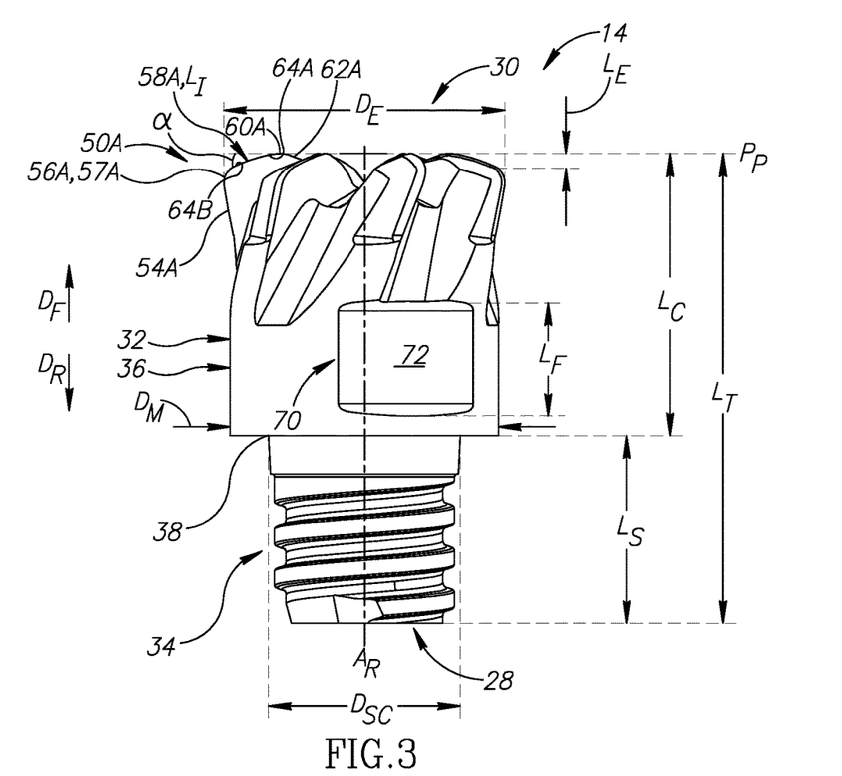
FIG. 3 is an enlarged side view of the milling head in FIG. 1.

Referring now to FIGS. 2 and 3, features more specifically relating to the subject matter of the present application will be described.

A central rotation axis $A_R$ extends longitudinally through the center of the head 14, defining opposite axially forward and rearward directions $D_F$, $D_R$ and opposite rotational preceding and succeeding directions $D_P$, $D_S$, the preceding direction $D_P$ being the cutting direction. An example inward direction $D_I$ is shown for understanding, but it will be understood that the term "inward direction" means generally directed toward the central rotation axis $A_R$. Similarly, an outward direction $D_O$ is also exemplified, and should be understood as generally directed away from the central rotation axis $A_R$. Hereinafter combined directions such as "forward-inward direction" and "rearward-inward direction" are used, which define a single direction resulting from a combination of components of both of the mentioned directions, although not necessarily an exact bisector between the two mentioned directions.

A perpendicular plane $P_P$ is located adjacent to the head front face 30 (i.e. extending at a intersecting a front point thereof, which in this case is constituted by the inner corners 60) and extends perpendicular to the central rotation axis $A_R$.

A cutting portion length $L_C$ is measurable parallel to the central rotation axis $A_R$. More precisely, the cutting portion length $L_C$ can be defined as extending from an intersection 38 of the shank-connector portion 34 and the cutting portion 36 to the head front face 30 (or, stated differently, to the perpendicular plane $P_P$).

A shank-connector length $L_S$ is measurable parallel to the central rotation axis $A_R$. More precisely, the shank-connector length $L_S$ can be defined as extending from the rear face 28 to the intersection 38.

A shank-connector diameter $D_{SC}$ (i.e. a maximum shank-connector diameter) can be smaller than a cutting portion diameter $D_E$ measurable perpendicular to the central rotation axis $A_R$. Preferably the shank-connector diameter $D_{SC}$ can be smaller than a smallest outer diameter $D_M$ of the cutting portion 36.

A total length $L_T$ can be defined from the head rear face 28 to the perpendicular plane $P_P$.

The cutting portion 36 comprises a plurality of integrally formed teeth 50 (e.g. first, second, third, fourth, fifth, and sixth teeth 50A, 50B, 50C, 50D, 50E, 50F) and a plurality of flutes 52 (e.g. first, second, third, fourth, fifth, and sixth flutes 52A, 52B, 52C, 52D, 52E, 52F) alternating with the plurality of teeth 50.

Figure 4:
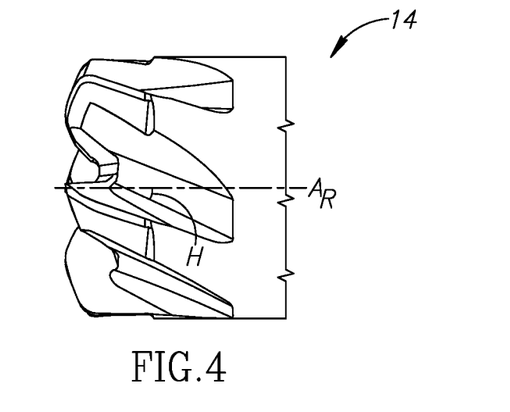
FIG. 4 is a side view of a part of a cutting portion of the milling head in FIGS. 1 to 3.
Figure 5:
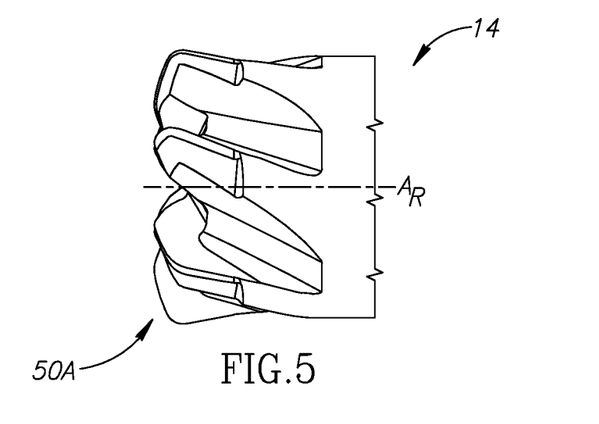
FIG. 5 is a side view of the same part of the cutting portion in FIG. 3, rotated to match the orientation shown in FIGS. 1 and 3.
Figure 6:
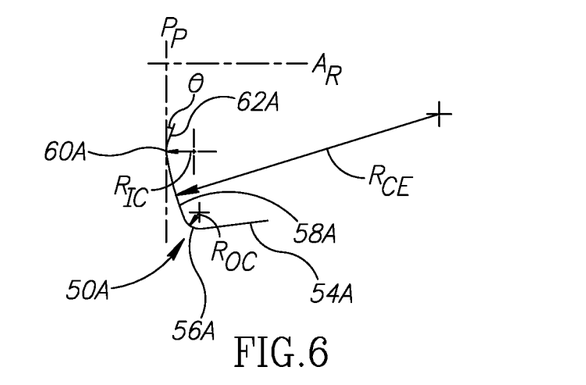
FIG. 6 is a schematic profile view of the lowermost tooth shown in FIG. 5.

Referring also to FIGS. 4 to 6, the teeth 50 and flutes 52 can be identical as shown, therefore a description below relating to any tooth or flute should be considered as relating to all.

The first tooth 50A can comprise a relief edge 54A, a convexly curved outer corner 56A, a primary cutting edge 58A, a convexly curved inner corner 60A, and a ramping cutting edge 62A.

The relief edge 54A can extend along the peripheral surface 32. The relief edge 54A can extend in a rearward-inward direction $D_R$, $D_I$ from the outer corner 56A.

The outer corner 56A can be connected to the relief edge 54A and comprises a radial extremity point 57A of the cutting portion 36. An outer corner radius $R_{OC}$ can have a preferred yet exemplary value of 0.6 mm.

The primary cutting edge 58A can be connected to the outer corner 56A and can extend in a forward-inward direction $D_F$, $D_I$ from the outer corner 56A. In cases where the cutting edge 58A is curved to a measurable extent, a preferred yet exemplary value of a cutting edge radius $R_{CE}$ thereof can be 10 mm.

The inner corner 60A can be connected to the primary cutting edge 58A.

The ramping cutting edge 62A can be connected to inner corner 60A and can extend in a rearward-inward direction $D_F$, $D_I$ from the inner corner 60A.

More precisely, a first connection point 64A can be defined where the primary cutting edge 58A and the inner corner 60A connect, a second connection point 64B can be defined where the primary cutting edge 58A and the outer corner 56A connect.

An imaginary straight line $L_I$ can be defined between the first and second connection points 64A, 64B and together with the perpendicular plane $P_P$ can subtend a cutting angle α. In the present example, the cutting edge radius $R_{CE}$ is so large that the primary cutting edge 58A essentially overlaps with the imaginary straight line $L_I$.

An effective cutting length $L_E$ can be defined from the second connection point 64B to the perpendicular plane $P_P$.

Each tooth 50 can be positioned front-of-center as shown. To elaborate, with reference to FIG. 2, a head 14 can be rotated until a radial line $L_R$ intersects an intersection point $P_I$ of a primary cutting edge 58A, as is shown in this case for the first tooth 50A. The intersection point $P_I$ coincides with the start of the intended main cutting edge, i.e. the second connection point 64B. Notably, at points along the primary cutting edge 58A closer to the central rotation axis $A_R$ than the intersection point $P_I$, the primary cutting edge 58A is in front of the radial line $L_R$ in the preceding direction $D_P$ (i.e. the cutting direction). Accordingly, as a chip (not shown) contacts the primary cutting edge 58A it is ejected away from the head 14, the basic direction being schematically shown by the arrow designated 66 (which is directed more towards the outward direction $D_O$ than the inward direction $D_I$).

In FIG. 6 a lead-in-angle θ is shown.

A coolant hole 68 can open out to the front face 30.

Using the first flute 52A as an example, during a facing application, coolant exiting the coolant hole 68 (not shown) flows through adjacent teeth (e.g. in the direction shown by arrow 69) which can further assist ejection of chips (not shown) already propelled in the direction shown by arrow 66.

In FIG. 4 a helix angle H is shown. While the helix angle values for this type of head are not limited, a preferential range would fulfil the condition 10°≤H≤30°. With values closer to 20° being considered more preferred.

Reverting to FIG. 3, it is noted that the head 14 is configured with a fastening construction 70 along the peripheral surface 32. The exemplary fastening construction 70 comprises two identical flat recesses 72 on opposite sides of the head 14 (only one of which being shown) which are configured for engagement with a spanner (not shown).

Since a fastening construction 70 along the head peripheral surface 32 can require some of the cutting portion's length (i.e. the fastening construction 70 shown requires a fastening construction length $L_F$), the head 14 can be lengthened to a greater cutting portion length $L_C$ than would strictly speaking be required for heat or machining purposes (i.e. such elongation being instead for ease of mounting the head 14 to the shank 12).

In the example shown the cutting portion length $L_C$ and cutting portion diameter $D_E$ are equal and hence LDR=1.00.

What is claimed is:

1. A replaceable face-milling head configured for rotating about a central rotation axis $A_R$ defining opposite axially forward and rearward directions $D_F$, $D_R$ and opposite rotational preceding and succeeding directions $D_P$, $D_S$, the preceding direction $D_P$ being the cutting direction, the face-milling head comprising:

a head rear face, a head front face and a head peripheral surface extending from the head rear face to the head front face;

a shank-connector portion formed with external threading and extending forward from the head rear face;

a cutting portion integrally formed with the shank-connector portion and extending forward from the shank-connector portion to the head front face, the cutting portion comprising a rearwardly facing cutting portion annular surface surrounding the shank-connector, the annular surface located at an intersection where the cutting portion and the shank-connector meet;

a cutting portion length $L_C$ measurable parallel to the central rotation axis AR, from the intersection to the head front face; and a perpendicular plane $P_P$ adjacent the front face and extending perpendicular to the central rotation axis $A_R$;

the cutting portion comprising:

a plurality of integrally formed teeth, each of the teeth comprising a primary cutting edge at the head front face;

a plurality of flutes alternating with the plurality of teeth; and a cutting portion diameter $D_E$;

characterized in that a length-diameter ratio LDR defined as the cutting portion length $L_C$ divided by the cutting portion diameter $D_E$ fulfills the condition: 0.3≤LDR≤1.00.

2. The face-milling head according to claim 1, wherein the length-diameter ratio LDR fulfills the condition: 0.3≤LDR≤0.90.

3. The face-milling head according to claim 2, wherein the length-diameter ratio LDR fulfills the condition: 0.90≥LDR≥0.40.

4. The face-milling head according to claim 1, wherein the length-diameter ratio LDR fulfills the condition: LDR=0.50±0.05.

5. The face-milling head according to claim 1, wherein the center of gravity of the head is located in the cutting portion.

6. The face-milling head according to claim 1, wherein each tooth of the plurality of teeth is positioned front-of-center.

7. The face-milling head according to claim 1, wherein a coolant hole opens out at a center of the head front face.

8. The face-milling head according to claim 1, wherein each tooth of the plurality of teeth further comprises: a relief edge extending along the peripheral surface; a convexly curved outer corner connected to the relief edge and comprising a radial extremity point of the cutting portion; said primary cutting edge connected to, and extending in a forward-inward direction from, the outer corner; a convexly curved inner corner connected to the primary cutting edge; and a ramping cutting edge connected to, and extending in a rearward-inward direction from, the inner corner.

9. The face-milling head according to claim 8, wherein in a rearward view along the central rotation axis $A_R$, each tooth of the plurality of teeth is convexly curved, at least from the inner corner to the outer corner.

10. The face-milling head according to claim 8, wherein: the primary cutting edge is convexly curved and has a cutting edge radius; the outer corner has an outer corner radius; and the cutting edge radius is greater than the outer corner radius.

11. The face-milling head according to claim 10, wherein the cutting edge radius is at least eight times greater that the outer corner radius.

12. The face-milling head according to claim 8, wherein the outer corner radius is smaller than or equal to 2 mm.

13. The face-milling head according to claim 8, wherein the relief edge extends in a rearward-inward direction from the outer corner.

14. The face-milling head according to claim 8, wherein: a first connection point is defined where the primary cutting edge and the inner corner connect; a second connection point is defined where the primary cutting edge and the outer corner connect; and an imaginary straight line is defined between the first and second connection points and together with the perpendicular plane subtends a cutting angle $\alpha$ fulfilling the condition: $10° \leq \alpha \leq 25°$.

15. The face-milling head according to claim 8, wherein a lead-in-angle $\theta$ subtended by the perpendicular plane $P_P$ and the central rotation axis $A_R$ fulfills the condition: $10° \leq \theta \leq 30°$.

16. The face-milling head according to claim 1, wherein a fastening construction is formed at the cutting portion along a head peripheral surface thereof and the length-diameter ratio LDR fulfills the condition: $0.50 \leq LDR \leq 1.00$.

17. The face-milling head according to claim 1, wherein the plurality of teeth is 5 to 7 teeth.

18. The face-milling head according to claim 17, wherein the plurality of teeth is exactly 6 teeth.

19. A face-milling assembly comprising:
a face-milling head according to claim 1; and
a shank comprising: a shank rear face; a shank front face; and a shank peripheral surface extending from the shank rear face to the shank front face; the shank front face being formed with an opening configured to receive the shank-connector portion.

20. A replaceable face-milling head configured for rotating about a central rotation axis $A_R$ defining opposite axially forward and rearward directions $D_F$, $D_R$ and opposite rotational preceding and succeeding directions $D_P$, $D_S$, the preceding direction $D_P$ being the cutting direction, the face-milling head comprising:
a head rear face, a head front face and a head peripheral surface extending from the head rear face to the head front face;
a shank-connector portion formed with external threading and extending forward from the head rear face;
a cutting portion integrally formed with the shank-connector portion and extending forward from the shank-connector portion to the head front face;
a cutting portion length $L_C$ measurable parallel to the central rotation axis $A_R$; and
a perpendicular plane $P_P$ adjacent the front face and extending perpendicular to the central rotation axis $A_R$;
the cutting portion comprising:
a plurality of integrally formed teeth, each of the teeth comprising a primary cutting edge at the head front face;
a plurality of flutes alternating with the plurality of teeth; and
a cutting portion diameter $D_E$;
wherein:
a length-diameter ratio LDR defined as the cutting portion length $L_C$ divided by the cutting portion diameter $D_E$ fulfills the condition: $0.3 \leq LDR \leq 0.9$.

21. The face-milling head according to claim 20, wherein the cutting portion length $L_C$ is defined from an intersection where the cutting portion and the shank-connector portion meet, to the head front face.

22. A replaceable face-milling head configured for rotating about a central rotation axis $A_R$ defining opposite axially forward and rearward directions $D_F$, $D_R$ and opposite rotational preceding and succeeding directions $D_P$, $D_S$, the preceding direction $D_P$ being the cutting direction, the face-milling head comprising:
a head rear face, a head front face and a head peripheral surface extending from the head rear face to the head front face;
a shank-connector portion formed with external threading and extending forward from the head rear face;
a cutting portion integrally formed with the shank-connector portion and extending forward from the shank-connector portion to the head front face;
a cutting portion length $L_C$ measurable parallel to the central rotation axis $A_R$; and
a perpendicular plane $P_P$ adjacent the front face and extending perpendicular to the central rotation axis $A_R$;
the cutting portion comprising:
a plurality of integrally formed teeth, each of the teeth comprising a primary cutting edge at the head front face;
a plurality of flutes alternating with the plurality of teeth; and
a cutting portion diameter $D_E$;
wherein:
a length-diameter ratio LDR defined as the cutting portion length $L_C$ divided by the cutting portion diameter $D_E$ fulfills the condition: $0.3 \leq LDR \leq 1.0$; and
each tooth of the plurality of teeth further comprises:
a relief edge extending along the peripheral surface;
a convexly curved outer corner connected to the relief edge and comprising a radial extremity point of the cutting portion, the primary cutting edge connected to, and extending in a forward-inward direction from, the outer corner;

a convexly curved inner corner connected to the primary cutting edge; and a ramping cutting edge connected to, and extending in a rearward-inward direction from, the inner corner.

23. The face-milling head according to claim 22, wherein the cutting portion length $L_C$ is defined from an intersection where the cutting portion and the shank-connector portion meet, to the head front face.

* * * * *